Dec. 30, 1941.  F. J. WESLEY  2,268,520
METHOD OF WELDING AND WELDED PRODUCT
Filed March 22, 1940
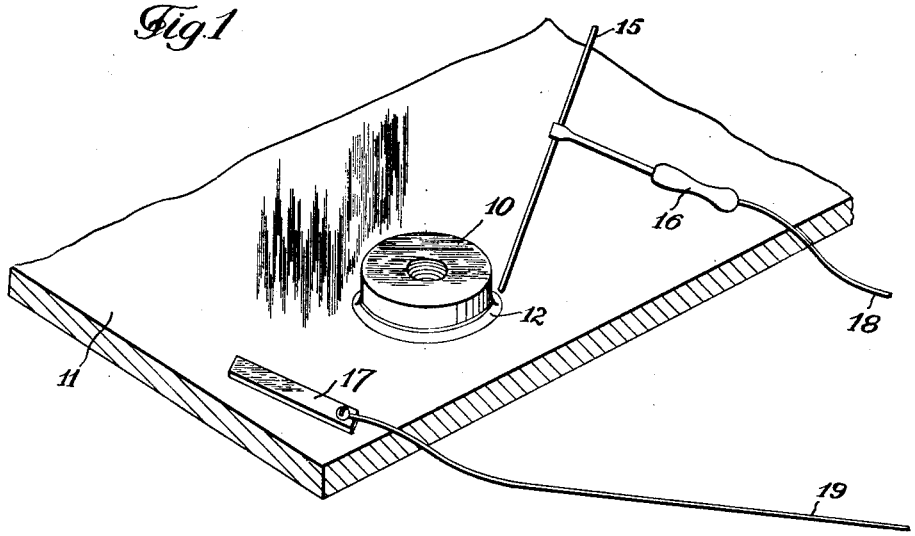
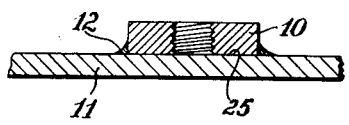
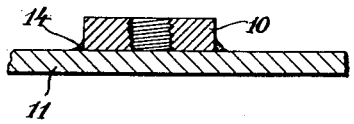
INVENTOR:
Frank J. Wesley
BY
ATTORNEY.

Patented Dec. 30, 1941

2,268,520

UNITED STATES PATENT OFFICE 2,268,520

METHOD OF WELDING AND WELDED PRODUCTS

Frank J. Wesley, Brooklyn, N. Y.

Application March 22, 1940, Serial No. 325,400

8 Claims. (Cl. 113—112)

This invention relates to methods of welding, and to combinations or products obtained by welding and materials used in welding.

One of the principal objects of the invention is to provide a method of securing metal parts which is simple and efficient.

Another object is to provide such a method which can be used advantageously in situations in which it is difficult to hold such parts accurately in place prior to or during the welding operation.

Another object is to provide such a method which is safer and more convenient for the workmen.

Another object is to reduce the amount of time and labor required in welding operations of certain types.

Another object is to provide a welded product which is superior in quality.

Further objects and advantages of the invention will be in part set forth in the following specification, and in part will be obvious therefrom without being specifically pointed out, the same being realized and attained as hereinafter more fully described or referred to or as pointed out in the claims hereof.

With the above and other objects of the invention in view, the invention consists in the novel construction, arrangement and combination of various devices, elements, parts and constituents, in the novel adhesive, and in the novel method, as set forth in the claims hereof, certain embodiments of the same being described in this specification and illustrated in the accompanying drawing.

In the accompanying drawing,

Fig. 1 shows a portion of a metal plate, to which a button having an internally screw-threaded bore, is being secured by my improved method;

Fig. 2 is a sectional view, prior to the actual welding; and

Fig. 3 is a similar view after completion of the welding.

One of the purposes for which my invention has been found very advantageous, is in the construction of steel ships. Modern battleships, for instance, being constructed mostly of steel, and in large proportion of steel plates, a difficulty arises in connection with the installation of electric wiring and other equipment. In the past, holes were drilled and tapped in the plates, and pipes and wiring were secured to the tapped holes. This, however, tended to weaken the plates, especially in places where many such holes were required; in addition it tended to destroy the watertight integrity of certain compartments.

At the present time, it is customary to weld to the plates steel buttons, having internally screw-threaded bores. These buttons are of any size and proportions required, and must be accurately arranged and firmly fastened in place. To these buttons are secured the wiring, piping, sheathing, or any other articles, equipment or material, as necessary.

Inasmuch as these buttons are frequently in such positions that it is difficult or impossible to hold them in place by clamps or other mechanical pressure during the welding operation, it has been necessary to have each button held in place by one man while another performs the actual welding operation. Such a practice results in various disadvantages. In the first place, two men are required. Secondly, the man holding the button in place is often burned by sparks or heat from the welding. Thirdly, it is difficult to hold the buttons accurately and closely in place by any stick or tool held in the hand; a slight shifting laterally in any direction will result in the cables or other equipment attached to the buttons being out of line, or would make it impossible to attach electrical connecting boxes, junction boxes, etc., or to secure any other articles or material correctly, and any uneven pressure on the button during welding may result in one side of the same being held closely to the plate while the other side might be perceptibly out of contact and would not be properly welded to the plate. Fourthly, it is an awkward, difficult and slow method of working, and consequently increases the labor costs.

In carrying my invention into effect in the embodiment which I have selected for illustration in the accompanying drawing and as one of the embodiments for description in this specification, I provide steel buttons of the conventional type, one of which is shown in the drawing and designated 10, and which is shown with a portion of a steel plate, designated 11. The rod, handle, weight, and portions of the two wires, of an electric welding machine are also indicated and are designated respectively 15, 16, 17, 18 and 19. It will be understood, however, that any suitable type of welding apparatus may be used, either manually or automatic.

I also provide an adhesive, comprising nitrocellulose and acetone. These are ordinarily used in the proportions of nitrocellulose fifty-five (55%) per cent and acetone forty-five (45%)

per cent, by weight. These proportions may be varied somewhat if desired. For example, during the summer months, the warm weather has a tendency to make the adhesive more fluid, in which case it is desirable to decrease the acetone about five per cent, the proportions being then approximately nitrocelluse sixty (60%) per cent and acetone forty (40%) per cent, by weight.

If desired, certain other ingredients may be added, although my adhesive comprising only nitrocellulose and acetone, has been found very satisfactory for the purpose.

A small quantity of either a plasticizer or non-drying oil, a drying oil, or a natural or synthetic resin, or two or more of the same, may be used.

For certain reasons mentioned below, it may also be desired to add a small quantity of a pigment, such as for instance oxide of zinc, to the adhesive.

The desired locations of the buttons are of course accurately ascertained and indicated in any convenient manner. The cement is then applied to the surface of the button which will be set adjacent the plate, to the proper portion of the plate, or both, and the button is pressed firmly and very closely in place and held for about five seconds. The adhesive will be practically all forced out by the pressure and will form a ring at the outer line of contact between the button and the plate, as indicated at 12, and will set and consequently hold the button firmly awaiting welding. A large number of buttons may be thus prepared, and the welder then goes from button to button and applies his electrode. No special preparation of the surfaces before applying the adhesive is necessary; the method is satisfactory whether the surfaces and the surrounding temperature are warm or cold; the adhesive may be applied in any convenient manner, as from a tube, by a brush, or otherwise. The consistency of the adhesive is such that it barely flows. As mentioned, practically all of the adhesive is forced out from between the button and plate, before the same is allowed to set, only a thin film (if any) remaining. Such a thin film is indicated in the drawing at 25 in Fig. 2. The welding takes place at the outside edge of the button, and in the welding process the adhesive outside of the button is completely consumed, and if any remains between the button and the plate it will act as a preservative of the iron or steel, preventing oxide of iron from forming in the event any airhole should exist in the weld. The burning of the adhesive also burns all foreign matter with it, thus improving the welding job.

It will be understood that a flux and other welding material of conventional type, may be used as desired. Fig. 3 of the drawing illustrates, in section, a button welded in place, the welding material remaining after the burning away of the adhesive being designated 14, at the angle of joining of the plate and button.

The heat of the welding not only consumes the adhesive, or practically all of the same, but the burning of the adhesive contributes to the efficiency of the welding operation by increasing the heat.

Inasmuch as the buttons are both accurately and closely secured in place in advance of the welding, a firm and secure weld and also a correct location are obtained, as well as greater speed and greater convenience and safety for the workmen.

After securing the buttons in place, the wiring, piping, or other equipment or materials, may be secured in the usual or any desired manner, to the buttons.

Although the securing of a button to a plate has been shown and described, it will be obvious that the same method is equally applicable to the securing together of other devices and parts, whether in the manufacture of battleships or other vessels, in the automobile industry, or in other lines. The method is also applicable to other materials than those mentioned.

The addition of a pigment, for instance oxide of zinc, will serve to retard the burning of the adhesive, in order that it may not be immediately consumed at the start of the welding.

It will be evident that in using this method there are many advantages, as well as advantages in the adhesive itself and in the product obtained. The advantage of an adhesive which serves the two-fold purpose of holding the parts in correct location and also contributing to the efficiency of the weld, is obvious. The method is quicker because it is a one-man operation instead of requiring a workman to hold the button in place for the welder. It is not necessary for the welder to wait for each button to be correctly placed, as a number of the same are cemented in place in advance and the welder proceeds directly from one button to another. In the old method, if the man holding the buttons had to leave, on account of burns or otherwise, the welder would have to await his return or get another man. In the old method the men holding the buttons have had their clothes, faces and hands burned, and the glare of the welding machine has produced sore eyes. Furthermore, a man holding a button would naturally turn his head away to protect his face from the flame and sparks, and in this way would sometimes not hold the button correctly, either exerting unequal pressure or pushing the button laterally more or less out of its intended location. In addition to the protection of the men, the actual saving in expense will be tremendous, owing to the large amount of such work required. The invention would have, in addition to ship-building, a large field of usefulness in the automobile industry, or in any other work where welding is required. It is particularly advantageous in the securing of parts in difficult locations.

Many other advantages of the invention will be seen from what has been above said, without being more specifically pointed out.

I do not limit myself to the particular details of construction, method, or constituents set forth in the foregoing specification or illustrated in the accompanying drawing, as the same refer to and set forth only certain embodiments of the invention, and it is obvious that the same may be modified, within the scope of the claims hereof, without departing from the spirit and scope of the invention.

Having thus described my invention, what I claim as new and desire to secure by Letters Patent is as follows:

1. A method of welding metal parts to a metal background comprising securing the parts to be welded in relative predetermined position by an adhesive, then welding said parts together, said adhesive being of sufficient strength to hold said parts accurately in predetermined position upon said background without additional holding means, prior to and during the welding operation.

2. A method of welding metal parts to a metal background comprising securing the parts to be welded in predetermined relative position by an adhesive including nitrocellulose and acetone, then welding said parts together, said adhesive being of sufficient strength to hold said parts accurately in predetermined position upon said background without additional holding means, prior to and during the welding operation.

3. A method of welding metal parts to a metal background comprising securing the parts to be welded in predetermined relative position by an adhesive including a cellulose derivative and a solvent, then welding said parts together, said adhesive being of sufficient strength to hold said parts accurately in predetermined position upon said background without additional holding means, prior to and during the welding operation.

4. A method of welding metal parts to a metal background comprising securing the parts to be welded in predetermined relative position by an adhesive, then welding said parts together, said adhesive being substantially burned away during the welding operation, said adhesive being of sufficient strength to hold said parts accurately in predetermined position upon said background without additional holding means, prior to and during the welding operation.

5. In combination, a metal surface and metal securing devices for wiring, piping, or other equipment, secured to said surface by an adhesive and welding, said adhesive sealing together adjacent unwelded surfaces thereof.

6. An installation system for wiring, piping, or other equipment, comprising in combination the base or background for said installation and securing devices for said equipment secured thereto by an adhesive and welding, said adhesive sealing together adjacent unwelded surfaces thereof.

7. A method of installing a wiring system or the like upon a metal background, which comprises attaching a series of metal holding members for securing said wiring or the like, in predetermined positions upon the face of said metal background by an adhesive, and thereafter welding said holding devices to said background, said adhesive being of sufficient strength to support said metal holding devices accurately in predetermined positions against the force of gravity, prior to and during the welding operation, without additional holding means.

8. A method of installing a wiring system or the like upon a background comprising a metal plate, which comprises attaching a series of metal holding members for securing said wiring or the like, in predetermined relative positions upon the face of said plate by an adhesive, and thereafter welding said holding devices to said background, said adhesive being of sufficient strength and tenacity to support said metal holding devices accurately in said predetermined positions against the force of gravity without additional holding means, during and prior to said welding operation; whereby said devices may be accurately fixed in place prior to the application of heat thereto for welding.

FRANK J. WESLEY.